(12) United States Patent
Jones et al.

(10) Patent No.: US 6,963,814 B2
(45) Date of Patent: Nov. 8, 2005

(54) SYSTEMS, DEVICES, AND METHODS FOR ACCEPTANCE TESTING A FIELDBUS COMPONENT CONFIGURATION PROGRAM

(75) Inventors: John David Jones, Johnson City, TN (US); Steven Michael Hausman, Johnson City, TN (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 11 days.

(21) Appl. No.: 10/734,010

(22) Filed: Dec. 11, 2003

(65) Prior Publication Data

US 2004/0193396 A1    Sep. 30, 2004

Related U.S. Application Data

(60) Provisional application No. 60/436,261, filed on Dec. 23, 2002.

(51) Int. Cl.$^7$ .............................................. G06F 19/00
(52) U.S. Cl. ........................ 702/119; 702/123; 710/8; 713/1; 700/2; 703/21
(58) Field of Search ................................ 709/201, 208, 709/223, 230; 700/2, 9, 19, 20; 702/123, 702/122, 188, 119; 710/8, 15; 713/1; 703/13, 703/21, 22

(56) References Cited

U.S. PATENT DOCUMENTS

| | | | |
|---|---|---|---|
| 5,276,811 A | 1/1994 | Zifferer et al. | |
| 5,442,639 A * | 8/1995 | Crowder et al. | 714/712 |
| 5,971,581 A * | 10/1999 | Gretta et al. | 700/83 |
| 6,442,441 B1 | 8/2002 | Walacavage et al. | |
| 6,446,202 B1 | 9/2002 | Krivoshein et al. | |
| 6,449,715 B1 * | 9/2002 | Krivoshein | 713/1 |
| 6,556,950 B1 | 4/2003 | Schwenke et al. | |
| 6,618,856 B2 | 9/2003 | Coburn et al. | |
| 6,823,280 B2 * | 11/2004 | Brayton et al. | 702/108 |
| 2002/0147505 A1 | 10/2002 | Beck et al. | |
| 2003/0061274 A1 * | 3/2003 | Lo | 709/203 |
| 2003/0061335 A1 * | 3/2003 | Thomas et al. | 709/223 |
| 2003/0125844 A1 | 7/2003 | Foertsch et al. | |
| 2004/0059851 A1 * | 3/2004 | Donaires | 710/104 |
| 2004/0064253 A1 * | 4/2004 | Brayton et al. | 702/2 |
| 2004/0078182 A1 * | 4/2004 | Nixon et al. | 703/22 |
| 2004/0088391 A1 * | 5/2004 | Ascoli et al. | 709/222 |
| 2004/0117166 A1 * | 6/2004 | Cassiolato | 703/13 |
| 2004/0148135 A1 * | 7/2004 | Balakrishnan et al. | 702/188 |
| 2004/0148371 A1 * | 7/2004 | Lin et al. | 709/223 |
| 2004/0153804 A1 * | 8/2004 | Blevins et al. | 714/33 |
| 2004/0199925 A1 * | 10/2004 | Nixon et al. | 719/315 |

(Continued)

FOREIGN PATENT DOCUMENTS

EP        1022626 A2    7/2000

(Continued)

OTHER PUBLICATIONS

Husemann et al., "BR-TOOL: A Real-Time Bus Monitoring and Validation System for Fieldbus-Based Industrial Automation Applications", IEEE, copyright 2003.*

Primary Examiner—Patrick J. Assouad

(57) ABSTRACT

Certain exemplary embodiments comprise a method for acceptance testing a fieldbus component configuration program. The method can comprise providing simulated input information to the fieldbus component configuration program. The method can further comprise comparing outputs from the fieldbus component configuration program to predetermined outputs. In certain exemplary embodiments, the method can comprise determining if the fieldbus component configuration program output is faulty.

23 Claims, 3 Drawing Sheets

U.S. PATENT DOCUMENTS

| | | | |
|---|---|---|---|
| 2004/0230323 A1 * | 11/2004 | Glanzer et al. | 700/18 |
| 2004/0230327 A1 * | 11/2004 | Opheim et al. | 700/83 |
| 2004/0236885 A1 * | 11/2004 | Fredriksson et al. | 710/100 |
| 2005/0007249 A1 * | 1/2005 | Eryurek et al. | 340/511 |
| 2005/0027376 A1 * | 2/2005 | Lucas et al. | 700/28 |
| 2005/0027377 A1 * | 2/2005 | Lucas et al. | 700/28 |
| 2005/0033466 A1 * | 2/2005 | Eryurek et al. | 700/108 |

FOREIGN PATENT DOCUMENTS

| | | |
|---|---|---|
| EP | 0929850 B1 | 12/2002 |
| EP | 1296232 A2 | 3/2003 |
| EP | 1296232 A3 | 8/2003 |
| WO | WO 98/14848 A1 | 4/1998 |
| WO | WO 00/65361 A1 | 11/2000 |
| WO | WO 01/53841 A1 | 7/2001 |

* cited by examiner

US 6,963,814 B2

SYSTEMS, DEVICES, AND METHODS FOR ACCEPTANCE TESTING A FIELDBUS COMPONENT CONFIGURATION PROGRAM

CROSS-REFERENCES TO RELATED APPLICATIONS

This application claims priority to, and incorporates by reference herein in its entirety pending U.S. Provisional Patent Application Ser. No. 60/436,261 filed 23 Dec. 2002.

BACKGROUND

U.S. Pat. No. 6,618,856 (Coburn), which is incorporated by reference herein in its entirety, allegedly cites a "method used with a simulator and a controller, the controller running execution code to provide output signals which, when linked to resources, cause the resources to cycle through requested activities, the simulator receiving controller output signals and, in response thereto, generating motion pictures of resources as the resources cycle through requested activities, the simulator using data structures which model the resources to determine which motion pictures to generate, the method for generating execution code and data structures for use by the controller and the simulator, respectively, and comprising the steps of, for each resource, encapsulating resource information including resource logic in a control assembly (CA), instantiating at least one instance of at least one CA, compiling instantiated CA instance resource logic to generate execution code, gleaning simulation information from the instantiated CA instances and using the gleaned simulation information to generate a simulation data structure for the resources corresponding to the instantiated CA instances." See Abstract.

U.S. patent application Ser. No. 20020147505 (Beck), which is incorporated by reference herein in its entirety, allegedly cites the "invention relates to a process for programming an automation application program on an automation equipment programming station. It comprises a step to define several structured type objects (1.10, 1.20) each representing an input-output channel of automation equipment, a step to write the application program (10) declaring symbolic input-output variables (100) of the program (10) as an instance of a previously defined structured type object, a step to configure symbolic input-output variables comprising a definition of the physical location of inputs-outputs of the automation equipment, a step (40) to automatically interpret the program to execute it on the automation equipment, comprising a step to replace symbolic variables (100) in the program by the complete topological address (200) of the corresponding input-output information." See Abstract.

U.S. patent application Ser. No. 20030125844 (Foertsch), which is incorporated by reference herein in its entirety, allegedly cites a "low-voltage power installation in which elements (1–11) are to be interconnected via an energy distribution system with several sections (12–27) is configured by means of a (partial) specification of the elements (1–11) and the sections (12–27). The (elements (1–11) and the sections (12–27) are specified by access to a catalogue (51) from which predefined (partial) specifications can be selected via an interface (43). The design of the sections (12–27) can be checked, supplemented or corrected according to a dimensioning criterion." See Abstract.

U.S. Pat. No. 6,449,715 (Krivoshein), which is incorporated by reference herein in its entirety, allegedly cites a "configuration system for use in a process control network having a controller, a first device network that communicates using a first input/output protocol, such as a Fieldbus or a HART device protocol, and a Profibus network that communicates using a Profibus input/output communication protocol includes a configuration database that stores configuration information pertaining to the first device network and configuration information pertaining to the Profibus device network, a data access routine that automatically requests configuration information pertaining to the first device network and configuration information pertaining to the Profibus device network and a configurator that configures the Profibus device network based on the Profibus device network configuration information. The configurator stores the Profibus device network configuration information in the configuration database along with configuration information pertaining to the first device network. A documentation routine accesses the configuration database to display a process control documentation schematic illustrating the configuration of the first device network and the Profibus device network within the process control system." See Abstract.

U.S. Pat. No. 6,556,950 (Schwenke), which is incorporated by reference herein in its entirety, allegedly cites a "data construct set and method for use with an industrial process which is controlled according to execution code wherein a processor running the code generates requests to mechanical resources to cause the resources to perform the process, the construct enabling generation of diagnostic code interspersed within the execution code which, when an event is to occur, indicates the event to occur, the invention also including status based diagnostics generally and methods of using the data construct set for generating both execution code and status based diagnostics." See Abstract.

SUMMARY

Certain exemplary embodiments comprise a method for acceptance testing a fieldbus component configuration program. The method can comprise providing simulated input information to the fieldbus component configuration program. The method can further comprise comparing outputs from the fieldbus component configuration program to predetermined outputs.

BRIEF DESCRIPTION OF THE DRAWINGS

A wide variety of potential embodiments will be more readily understood through the following detailed description, with reference to the accompanying drawings in which.

DEFINITIONS

Figure 1:
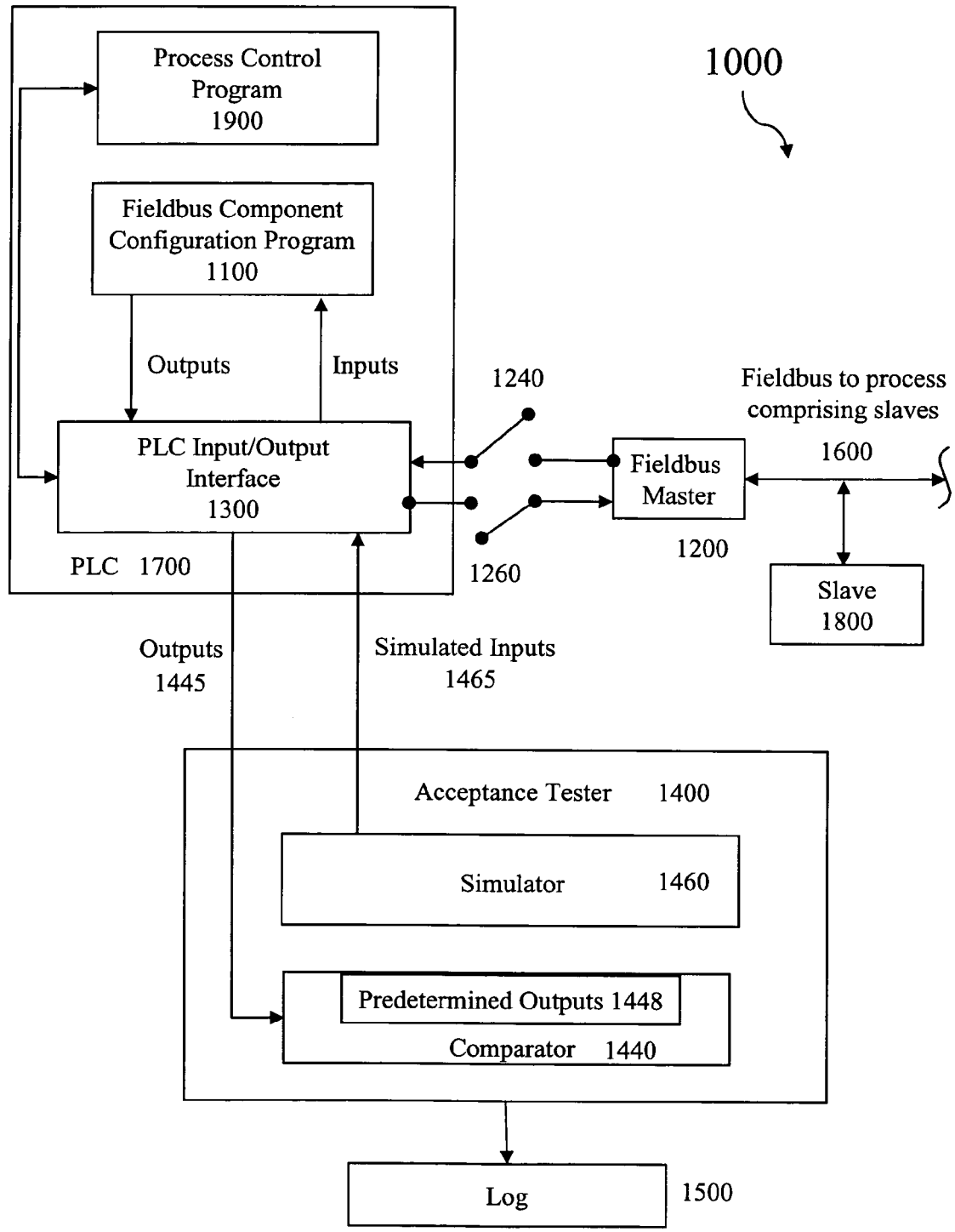
FIG. 1 is a block diagram of an exemplary embodiment of an acceptance testing system 1000.

When the following terms are used herein, the accompanying definitions apply:

acceptance tester—a device and/or a system that performs acceptance testing.

acceptance testing—an evaluation of whether an item satisfies one or more specifications.

actuator-sensor interface (AS-i) network—a type of fieldbus.

addresses—names or numbers used for identification in information storage or retrieval that are assignable to a specific machine or component.

comparator—an apparatus and/or system that compares a measured outcome with a specified outcome.

configuration program—hardware, firmware, and/or software that changes the way in which a component and/or system is configured.

controlled device—a device controllable by another device or by a program. Examples include an actuator, motor starter, push button, solenoid, a relay, a switch, and/or a speed control, etc.

fault—defect or imperfection.

faulty—containing a fault or defect; imperfect or defective.

fieldbus—a digital, serial, two-way communications system that interconnects measurement and/or control equipment such as sensors, actuators, and/or controllers. A fieldbus can serve as a Local Area Network (LAN) for instruments used in process control and/or manufacturing automation applications.

fieldbus component—a sensor, actuator, or controller.

input—a signal, data, and/or information provided to a processor.

input device—a device that can provide a signal to a fieldbus. Examples include transducers, sensors, switches, push buttons, etc., as well as a computer program.

log—a record of events.

master—a machine or component adaptable to control another machine or component.

network—two or more information devices that are linked to share resources (such as printers or CD-ROMs), exchange files, or allow electronic communications therebetween. Information devices on a network can be linked through various wireline or wireless media, such as cables, telephone lines, power lines, optical fibers, radio waves, light beams, etc.

process control program—software for controlling a machine or group of machines to perform a defined task.

programmable logic controller (PLC)—a device that follows programmed instructions to provide automated monitoring and/or control functions over a machine and/or process by evaluating a set of inputs. A PLC can be used to automate complex functions, for example, in machining, packaging, materials handling, and/or other applications. A PLC can be utilized to control an industrial process.

sensor—a device used to measure a physical quantity (e.g., temperature, pressure, capacitance, and/or loudness, etc.) and convert that physical quantity into a signal of some kind (e.g., voltage, current, power, etc.). A sensor can be any instrument such as, for example, any instrument measuring pressure, temperature, flow, mass, heat, light, sound, humidity, proximity, position, velocity, vibration, voltage, current, capacitance, resistance, inductance, and/or electromagnetic radiation, etc. Such instruments can comprise, for example, proximity switches, photo sensors, thermocouples, level indicating devices, speed sensors, electrical voltage indicators, electrical current, on/off indicators, and/or flowmeters, etc.

simulated—created as a representation or model of another thing.

simulator—an apparatus and/or system that generates inputs approximating actual or operational conditions.

slave—an input device or a controllable device.

slave profile—an agreed upon standard for identifying slaves based on slave capabilities.

type of slave—one of three standard varieties defined by a slave profile comprising standard digital slaves, digital slaves with extended addressing mode (A-Slaves and B-Slaves), and analog slaves.

DETAILED DESCRIPTION

FIG. 1 is a block diagram of an exemplary embodiment of an acceptance testing system 1000. System 1000 can comprise a fieldbus master 1200. Master 1200 can be connectable to a fieldbus 1600. In certain exemplary embodiments, master 1200 can be the sole master. In certain exemplary embodiments, a plurality of masters 1200 can be present. Fieldbus 1600 can serve as a Local Area Network (LAN) for slaves 1800 used in process control and/or manufacturing automation applications.

In certain exemplary embodiments, communication addresses can be assigned to slaves 1800. Data and/or communications relating to slaves 1800 that are connectable to fieldbus 1600 can be configurable using a fieldbus component configuration program 1100. Fieldbus component configuration program 1100 can provide and/or confirm addresses of slaves 1800 on fieldbus 1600. Fieldbus component configuration program 1100 can be further adaptable to define communication protocols to slaves 1800 for proper communication with master 1200. In certain exemplary embodiments, fieldbus component configuration program 1100 can reside on a PLC 1700. In certain exemplary embodiments fieldbus component configuration program 1100 can reside on an information device connectable to PLC 1700.

In certain exemplary embodiments, fieldbus component configuration program 1100 can relate to fieldbus 1600, which can be an AS-i network, a Profibus, a Foundation Fieldbus, an Interbus, a DeviceNet network, a HART network, a CAN network, a Modbus, a Controlnet network, and/or a WorldFIP network, etc.

Fieldbus 1600 can comprise any of a plurality of network structures such as, for example, a ring structure, a star structure, and/or chain structure, etc., and/or any equivalents thereof. In certain exemplary embodiments, fieldbus 1600 can feed power to slaves 1800 connectable to fieldbus 1600.

In certain exemplary embodiments, master 1200 can be connected to a PLC 1700. PLC 1700 can be used to automate complex functions, for example, in machining, packaging, materials handling, industrial processing, and/or other applications. PLC 1700 can be utilized to control an industrial process. In certain exemplary embodiments, PLC 1700 can use a process control program 1900. In certain exemplary embodiments, PLC 1700 can be further connectable to an acceptance tester 1400.

PLC 1700 can comprise PLC input/output interface 1300. PLC input/output interface 1300 can be adaptable to allow fieldbus component configuration program 1100 to communicate with master 1200. In certain exemplary embodiments, through master 1200 fieldbus component configuration program 1100 can configure at least one slave 1800. PLC input/output interface 1300 can open and/or shut switches 1240, 1260. Switches 1240, 1260 and the circuits on which they reside can be physical or virtual. When open, switches 1240, 1260 can prevent data flow between master 1200 and PLC input/output interface 1300. PLC input/output interface 1300 can open switches 1240, 1260 to interrupt communications with fieldbus master 1200 in order to perform acceptance testing on fieldbus component configuration program 1100.

In certain exemplary embodiments, master 1200, fieldbus 1600, and slave 1800 can be physically disconnected from PLC 1700. In certain exemplary embodiments, instructions comprised in PLC 1700 can simulate master 1200, fieldbus 1600, and/or slave 1800. In certain exemplary embodiments, acceptance tester 1400 can be adaptable to verify the proper performance of fieldbus component configuration program 1100 with no master 1200, fieldbus 1600, and/or slave 1800 connected to PLC 1700.

An acceptance tester 1400 can signal PLC input/output interface 1300 to interrupt process communications in order to verify the proper performance of fieldbus component configuration program 1100. In certain exemplary embodiments, acceptance tester 1400 can reside on PLC 1700. In certain exemplary embodiments, acceptance tester 1400 can reside on an information device connectable to PLC 1700. In certain exemplary embodiments, acceptance tester 1400 can comprise a simulator 1460. In certain exemplary embodiments, acceptance tester 1400 can comprise a comparator 1440.

Simulator 1460 can obtain, create, and/or generate simulated inputs 1465, and/or provide inputs 1465 to fieldbus component configuration program 1100. Providing simulated inputs 1465 from simulator 1460 to fieldbus component configuration program 1100 can allow a user to model a plurality of components and/or component configurations. Providing simulated inputs 1465 can provide a means of verifying proper performance of fieldbus component configuration program 1100 with a wide variety of possible hardware and/or software configurations.

In certain exemplary embodiments, simulated inputs 1465 provided by simulator 1460 can comprise inputs associated with: at least one master 1200, at least one master 1200 comprising an out of range version number, a control line between PLC 1700 and at least one master 1200, at least one slave, a plurality of slaves, a plurality of possible slave profiles, a plurality of possible types of slaves, an unknown type of slave, a plurality of possible slave failures, a movement of slaves 1800 among various available addresses on a network, a PLC process control program 1900 communicable with masters 1200 and slaves, and/or at least one user input to fieldbus component configuration program 1100. In supplying inputs 1465 across a plurality of hardware and/or software profiles and/or configurations, acceptance tester 1400 can test the performance of fieldbus component configuration program 1100 in response to a plurality of common and/or uncommon conditions on fieldbus 1600. By providing a spectrum of simulated inputs 1465, the use of acceptance tester 1400 can improve the performance and/or reliability of fieldbus component configuration program 1100, fieldbus master 1200, and/or fieldbus 1600.

In certain exemplary embodiments, fieldbus component configuration program 1100, simulator 1460, comparator 1440 can reside on PLC 1700. In certain exemplary embodiments, fieldbus component configuration program 1100, simulator 1460, comparator 1440 can reside on an information device connectable to PLC 1700. Using comparator 1440, outputs 1445 from fieldbus component configuration program 1100 can be compared to predetermined outputs 1448 indicative of proper performance of fieldbus component configuration program 1100. In certain exemplary embodiments, predetermined outputs 1448 can be provided by fieldbus component configuration program 1100, acceptance tester 1400, comparator 1440, and/or simulator 1460, and/or a memory couplable thereto, etc.

The predetermined outputs 1448 can be stored in fieldbus component configuration program 1100, acceptance tester 1400, comparator 1440, simulator 1460, and/or a memory. Deviations detected by comparator 1440 can be indicative of a fault in fieldbus component configuration program 1100.

Information from acceptance tester 1400 can be provided to log 1500. Log 1500 can comprise information regarding a testing date, testing time, test operator, test version, test protocol, tested fieldbus, tested components, configurations of components, and/or component parameters, etc. Log 1500 can comprise information indicative of faults in fieldbus component configuration program 1100. Log 1500 can be stored in a memory, a file, or output to a printer, monitor, etc.

Figure 2:
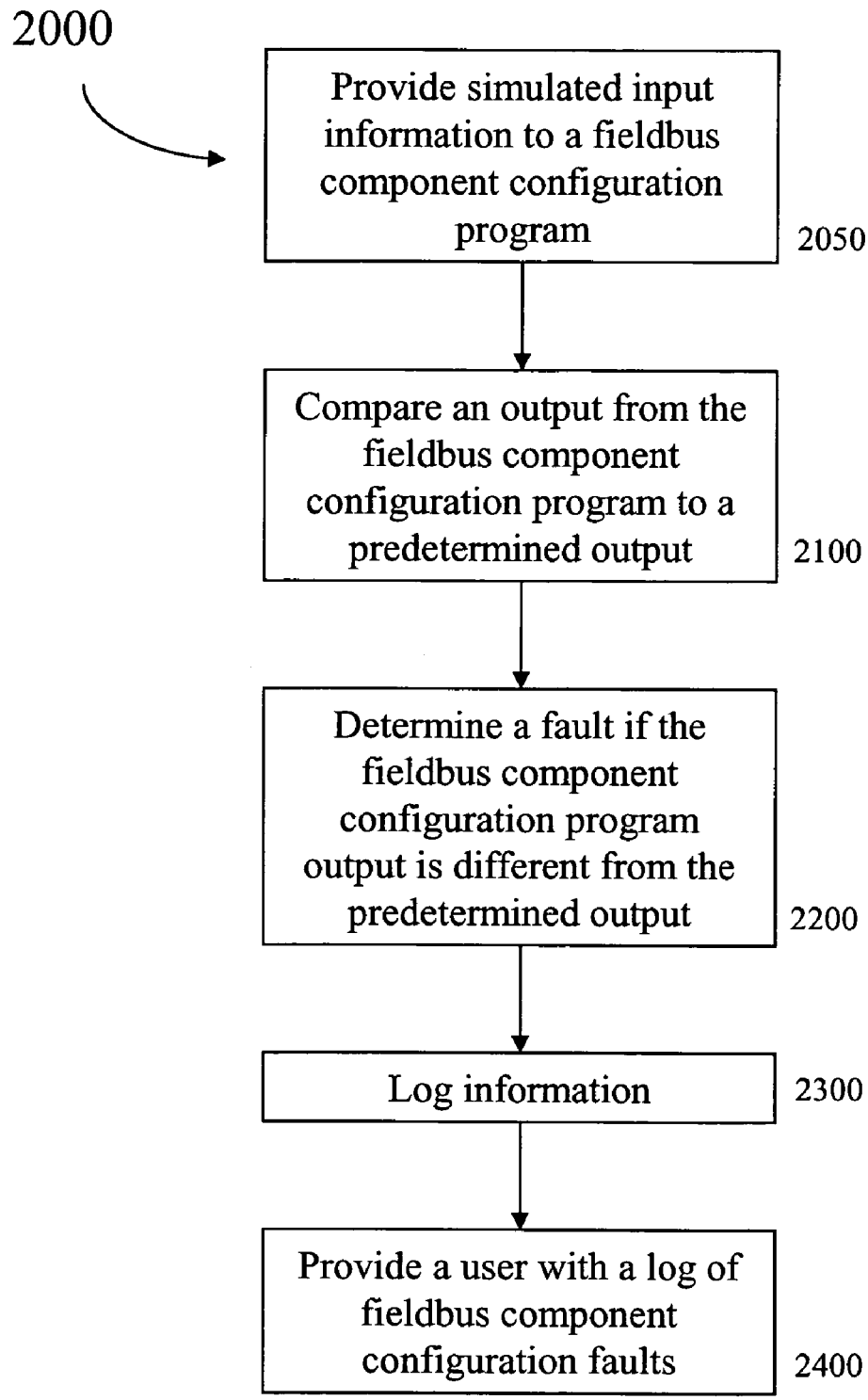
FIG. 2 is a flow diagram of an exemplary embodiment of a method of use 2000 for testing a fieldbus component configuration program.

FIG. 2 is a flow diagram of an exemplary embodiment of a method of use 2000 for testing a fieldbus component configuration program. At activity 2050, simulated input information can be provided to the fieldbus component configuration program. The simulated input information can be provided by the acceptance tester and/or the simulator.

At activity 2100, an output can be obtained from the fieldbus component configuration program. The output from the fieldbus component configuration program can be responsive to simulated inputs provided to the fieldbus component configuration program from the simulator. The output can be compared to a predetermined output indicative of proper performance of the fieldbus component configuration program.

At activity 2200, a fault can be determined if the output of the fieldbus component configuration program differs from the predetermined output. A deviation, or perhaps a predetermined level of deviation, from the predetermined output can be indicative of a fault and/or faulty behavior from the fieldbus component configuration program. A deviation from predetermined outputs can be indicative that the fieldbus component configuration program requires additional programming work and/or debugging.

At activity 2300, information obtained from the fieldbus component configuration program can be placed in a log. The log can comprise fault information determined from deviations of outputs from the fieldbus component configuration program compared to predetermined outputs. In certain exemplary embodiments, the log of fault information can further comprise information from the fieldbus component configuration program indicative of faulty inputs.

At activity 2400, a user can be provided with a copy of the log of fault information. Providing the user with the log of fault information can allow the user to determine whether simulated inputs provided to the fieldbus component configuration program represented valid and/or expected inputs. Providing the user with the log of fault information can allow the user to repair, reprogram, and/or debug the fieldbus component configuration program.

Figure 3:
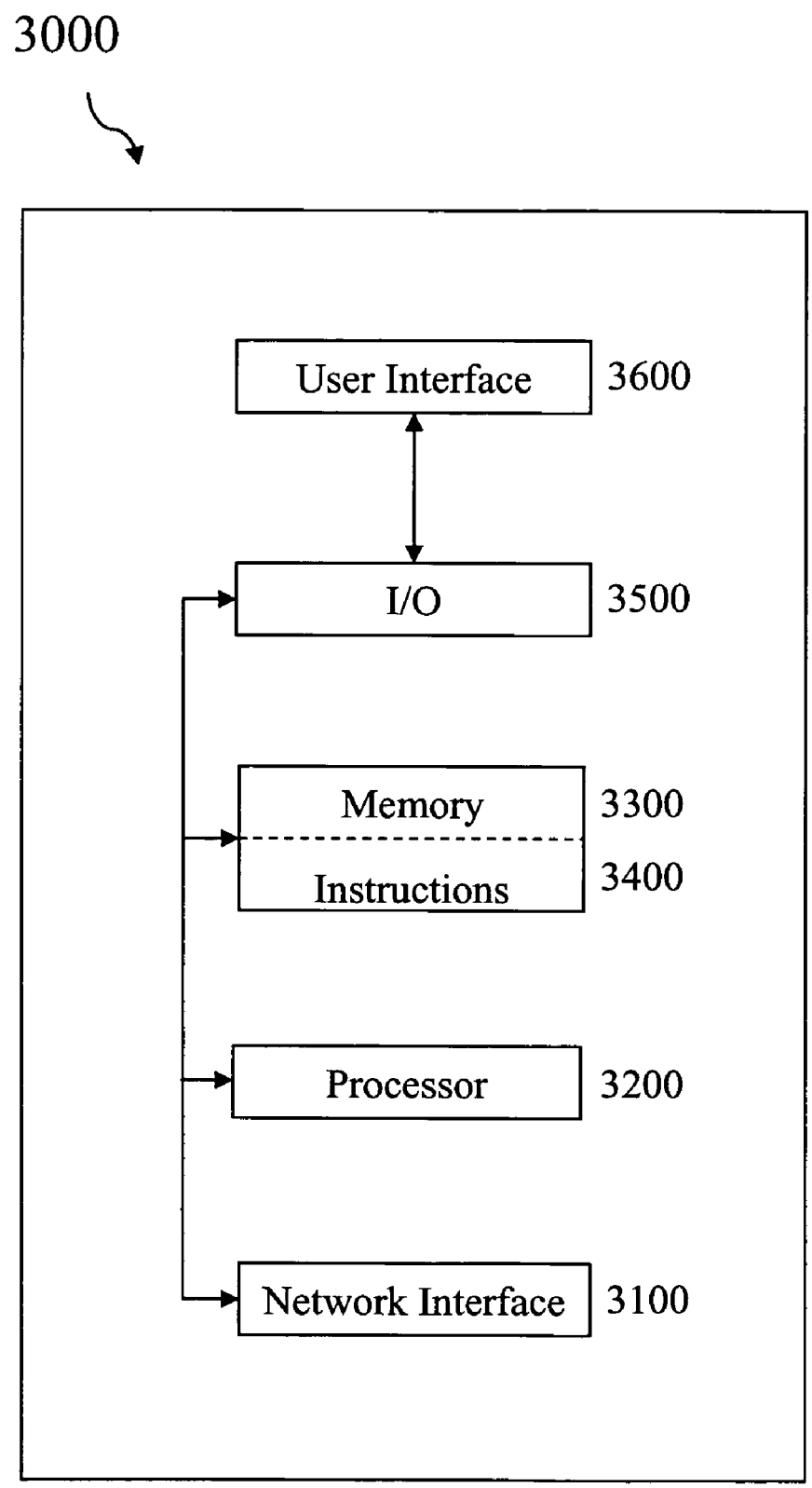
FIG. 3 is a block diagram of an exemplary embodiment of an information device 3000.

FIG. 3 is a block diagram of an exemplary embodiment of an information device 2000, which in certain operative embodiments can comprise, for example, master 1100 and/or PLC 1700 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, U.S. patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method for acceptance testing a fieldbus component configuration program comprising:
    providing a plurality of simulated inputs to a fieldbus component configuration program; and
    comparing an output from the fieldbus component configuration program to a predetermined output.
2. The method of claim 1, further comprising:
    generating the plurality of simulated inputs.
3. The method of claim 1, wherein the fieldbus component configuration program relates to an actuator-sensor interface network.
4. The method of claim 1, further comprising:
    determining if the fieldbus component configuration program output is faulty.
5. The method of claim 1, further comprising:
    logging a faulty fieldbus component configuration program output.
6. The method of claim 1, further comprising:
    logging information obtained from the fieldbus component configuration program.
7. The method of claim 1, further comprising:
    providing to a user a log comprising a faulty fieldbus component configuration program output.
8. The method of claim 1, wherein at least one of the simulated inputs is associated with at least one master.
9. The method of claim 1, wherein at least one of the simulated inputs is associated with at least one master comprising an out of range version number.
10. The method of claim 1, wherein at least one of the simulated inputs is associated with a control line between a PLC and at least one master.
11. The method of claim 1, wherein at least one of the simulated inputs is associated with at least one slave.
12. The method of claim 1, wherein the plurality of simulated inputs comprises inputs associated with a plurality of slaves.
13. The method of claim 1, wherein the plurality of simulated inputs comprises inputs associated with a plurality of possible of slave profiles.
14. The method of claim 1, wherein the plurality of simulated inputs comprises inputs associated with a plurality of possible types of slave.
15. The method of claim 1, wherein at least one of the simulated inputs is associated with an unknown type of slave.
16. The method of claim 1, wherein the plurality of simulated inputs comprises inputs associated with a plurality of possible slave failures.
17. The method of claim 1, wherein the plurality of simulated inputs comprises inputs associated with a movement of slaves among various available addresses on a network.
18. The method of claim 1, wherein at least one of the simulated inputs is associated with a PLC process control program communicable with masters and slaves.
19. The method of claim 1, wherein at least one of the simulated inputs is associated with at least one user input to said configuration program.
20. An acceptance tester adaptable to test a fieldbus component configuration program, said tester comprising:
    a simulator adapted to provide a plurality of simulated inputs to a fieldbus component configuration program; and
    a comparator adapted to compare an output from the fieldbus component configuration program to a predetermined output.
21. A system comprising:
    a configuration program adapted to configure fieldbus components; and
    an acceptance tester adapted to evaluate an output of said configuration program relatable to at least one simulated input to said configuration program.
22. A machine-readable medium storing instructions for activities comprising:
    providing a plurality of simulated inputs to a fieldbus component configuration program; and
    comparing an output from the fieldbus component configuration program to a predetermined output.
23. A system adaptable to test a fieldbus component configuration program, comprising:
    means for providing a plurality of simulated inputs to a fieldbus component configuration program; and
    means for comparing an output from the fieldbus component configuration program to a predetermined output.

* * * * *